US012133263B2

(12) United States Patent
Xiong et al.

(10) Patent No.: US 12,133,263 B2
(45) Date of Patent: Oct. 29, 2024

(54) METHOD AND APPARATUS FOR TRANSMITTING A SIGNAL IN WIRELESS COMMUNICATION SYSTEM

(71) Applicant: Samsung Electronics Co., Ltd., Gyeonggi-do (KR)

(72) Inventors: Qi Xiong, Beijing (CN); Bin Yu, Beijing (CN); Feifei Sun, Beijing (CN); Yi Wang, Beijing (CN)

(73) Assignee: Samsung Electronics Co., Ltd (KR)

( * ) Notice: Subject to any disclaimer, the term of this patent is extended or adjusted under 35 U.S.C. 154(b) by 376 days.

(21) Appl. No.: 17/419,593

(22) PCT Filed: Dec. 30, 2019

(86) PCT No.: PCT/KR2019/018709
§ 371 (c)(1),
(2) Date: Jun. 29, 2021

(87) PCT Pub. No.: WO2020/139053
PCT Pub. Date: Jul. 2, 2020

(65) Prior Publication Data
US 2022/0116999 A1 Apr. 14, 2022

(30) Foreign Application Priority Data

Dec. 29, 2018 (CN) .......................... 201811654158.5
Feb. 25, 2019 (CN) .......................... 201910141008.2
Dec. 30, 2019 (KR) .......................... 10-2019-0177330

(51) Int. Cl.
*H04W 74/0833* (2024.01)
*H04L 5/00* (2006.01)
*H04W 74/00* (2009.01)

(52) U.S. Cl.
CPC ....... *H04W 74/0833* (2013.01); *H04L 5/0051* (2013.01); *H04W 74/006* (2013.01)

(58) Field of Classification Search
CPC ... H04W 74/08; H04W 74/00; H04W 74/006; H04W 74/0833; H04W 56/001; H04W 72/1205; H04W 24/10; H04W 8/24
See application file for complete search history.

(56) References Cited

U.S. PATENT DOCUMENTS

2017/0367120 A1    12/2017  Murray et al.
2018/0176962 A1*    6/2018  Wu ................... H04W 74/0833
(Continued)

FOREIGN PATENT DOCUMENTS

CN          108282895         7/2018
CN          108702698        10/2018
(Continued)

OTHER PUBLICATIONS

ASUSTeK, "Consideration on Fallback of 2-Step RACH Procedure", R2-1700024, 3GPP TSG-RAN WG2 Meeting #NR Ad Hoc, Jan. 17-19, 2017, 4 pages.
(Continued)

*Primary Examiner* — Iqbal Zaidi
(74) *Attorney, Agent, or Firm* — The Farrell Law Firm, P.C.

(57) ABSTRACT

The present disclosure relates to a pre-5$^{th}$-Generation (5G) or 5G communication system to be provided for supporting higher data rates Beyond 4th-Generation (4G) communication system such as Long Term Evolution (LTE). The present disclosure provides a method for operating a user equipment (UE) in wireless communication system. The method includes: receiving, from a base station, configuration information for a two-step random access transmission; determining a resource configuration for transmitting a first message of the two-step random access transmission based on the obtained configuration information for the two-step random access transmission, wherein the first message comprises a preamble and data; transmitting, to the base station,
(Continued)

the first message according to the determined resource configuration; detecting a second message from the base station as a feedback of the first message; and performing a subsequent operation according to the detected second message.

20 Claims, 12 Drawing Sheets

(56) References Cited

U.S. PATENT DOCUMENTS

| | | | |
|---|---|---|---|
| 2018/0205516 | A1 | 7/2018 | Jung et al. |
| 2019/0007940 | A1 | 1/2019 | Lee et al. |
| 2019/0199477 | A1 | 6/2019 | Park et al. |
| 2020/0145089 | A1* | 5/2020 | Wei .................. H04W 76/27 |
| 2021/0126698 | A1* | 4/2021 | Tsai .................. H04B 17/318 |
| 2021/0219349 | A1* | 7/2021 | Huang ............. H04W 74/0833 |
| 2022/0046718 | A1 | 2/2022 | Ren et al. |

FOREIGN PATENT DOCUMENTS

| | | |
|---|---|---|
| CN | 108781463 | 11/2018 |
| EP | 2 903 383 | 8/2015 |
| KR | 2016-0120326 | 10/2016 |
| WO | WO 2018-127502 | 7/2018 |
| WO | WO 2018-143740 | 8/2018 |
| WO | WO 2018-144560 | 8/2018 |

OTHER PUBLICATIONS

Ericsson, "NR Two-Step Random Access Procedure", R1-1700300, 3GPP TSG-RAN WG1 NR adhoc, Jan. 16-20, 2017, 4 pages.
European Search Report dated Jan. 31, 2022 issued in counterpart application No. 19902040.5-1215, 9 pages.
Chinese Office Action dated Mar. 27, 2023 issued in counterpart application No. 201910141008.2, 12 pages.
PCT/ISA/210 Search Report issued on PCT/KR2019/018709, Apr. 22, 2020, pp. 4.
PCT/ISA/237 Written Opinion issued on PCT/KR2019/018709, Apr. 22, 2020, pp. 6.
3GPP TSG-RAN WG2 Meeting #106 R2-1908105, Reno, USA, May 13-17, 2019, Report from session on Legacy LTE, Rel-15 LTE, and NR NTN SI, NR power saving SI (37 pp).
3GPP TSG-RAN WG2 Meeting #105bis R2-1905185, Xi'an, China, Apr. 8-Apr. 12, 2019, Report from session on Legacy LTE, Rel-15 LTE, and NR NTN SI. NR power saving SI, NR DC/CA enh (30 pp).
3GPP TSG RAN WG1 #97 R1-1906906, Reno, USA, May 13-17, 2019, Procedure for Two-step RACH (8 pp).
3GPP TSG RAN WG1 #97 R1-1906905, Reno, USA, May 13-17, 2019, Channel Structure for Two-Step RACH (11 pp).
3GPP TSG RAN WG1 #96bis R1-1904393, Xi'an, China, Apr. 8-12, 2019, Procedure for Two-Step RACH (5 pp).
3GPP TSG RAN WG1 #96bis R1-1904392, Xi'an, China, Apr. 8-12, 2019, Channel Structure for Two-Step RACH (8 pp).
3GPP TSG RAN WG1 #96 R1-1902242, Athens, Greece, Feb. 25-Mar. 1, 2019, Procedure for Two-Step RACH (4 pp).
3GPP TSG RAN WG1 #96 R1-1902241, Athens, Greece, Feb. 25-Mar. 1, 2019, Channel Structure for Two-Step RACH (5 pp).
3GPP TSG RAN WG1 Meeting #96bis, Xi'an, China, Apr. 8-12, 2019, RAN1 Chairman's Notes (108 pp).
3GPP TSG-RAN WG2 Meeting #103 R2-1817075, Spokane, USA, Nov. 12-16, 2018, Considerations on initial access procedures for NR unlicensed operations (4 pp).
European Search Report dated Dec. 8, 2023 issued in counterpart application No. 19902040.5-1215, 5 pages.
Chinese Office Action dated Feb. 21, 2024 issued in counterpart application No. 201910141008.2, 15 pages.

* cited by examiner

METHOD AND APPARATUS FOR TRANSMITTING A SIGNAL IN WIRELESS COMMUNICATION SYSTEM

PRIORITY

This application is a National Phase Entry of International Application No. PCT/KR2019/018709, which was filed on Dec. 30, 2019, and claims priority to Chinese Patent Application Nos. 201811654158.5 and 201910141008.2, which were filed on Dec. 29, 2018 and Feb. 25, 2019, respectively, and to Korean Patent Application No. 10-2019-0177330, which was filed on Dec. 30, 2019, the entire content of each of which is incorporated herein by reference.

TECHNICAL FIELD

The present disclosure relates to wireless communication technology, in particular to method and apparatus for transmitting a signal in wireless communication system.

BACKGROUND ART

To meet the demand for wireless data traffic having increased since deployment of 4 to generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

According to various embodiments of the present disclosure, the UE can access the network more rapidly, and data transmission can be completed more rapidly.

Solution to Problem

According to various embodiments of the present disclosure, a method for operating a user equipment (UE) in wireless communication system is provided. The method comprises: receiving, from a base station, configuration information for a two-step random access transmission; determining a resource configuration for transmitting a first message of the two-step random access transmission based on the obtained configuration information for the two-step random access transmission, wherein the first message comprises a preamble and data; transmitting, to the base station, the first message according to the determined resource configuration; detecting a second message from the base station as a feedback of the first message; and performing a subsequent operation according to the detected second message.

According to various embodiments of the present disclosure, a method for operating a base station in wireless communication system is provided. The method comprises: transmitting, to a user equipment (UE), configuration information for a two-step random access transmission; receiving, from the UE, a first message according to a resource configuration determined based on the configuration information, wherein the first message comprises a preamble and data; and transmitting, to the UE, a second message as a feedback of the first message, wherein the second message comprises at least one of a contention resolution identifier, an uplink grant, a temporary Cell Radio Network Temporary Identifier (C-RNTI) a timing advance value, a Physical Uplink Control Channel (PUCCH) resource indication, scheduling information for a downlink transmission, a fallback indicator, or a backoff indicator.

According to various embodiments of the present disclosure, a user equipment (UE) in wireless communication system is provided. The user equipment comprises: a transceiver; and a processor operably coupled to the transceiver, and configured to: receive, from a base station, configuration information for a two-step random access transmission; determine a resource configuration for transmitting a first message of the two-step random access transmission based on the obtained configuration information for the two-step random access transmission, wherein the first message comprises a preamble and data; transmit, to the base station, the first message according to the determined resource configuration; detect a second message from the base station as a feedback of the first message; and perform a subsequent operation according to the detected second message.

According to various embodiments of the present disclosure, a base station in wireless communication system is provided. The base station comprises: a transceiver; and a processor operably coupled to the transceiver, and configured to: transmit, to a user equipment (UE), configuration information for a two-step random access transmission; receive, from the UE, a first message according to a resource configuration determined based on the configuration information, wherein the first message comprises a preamble and data; and transmit, to the UE, a second message as a feedback of the first message, wherein the second message comprises at least one of a contention resolution identifier, an uplink grant, a temporary Cell Radio Network Temporary Identifier (C-RNTI) a timing advance value, a Physical Uplink Control Channel (PUCCH) resource indication, scheduling information for a downlink transmission, a fallback indicator, or a backoff indicator.

Advantageous Effects of Invention

According to various embodiments of the present disclosure, the UE can access the network more rapidly, and data transmission can be completed more rapidly.

BEST MODE FOR CARRYING OUT THE INVENTION

Figure 1:
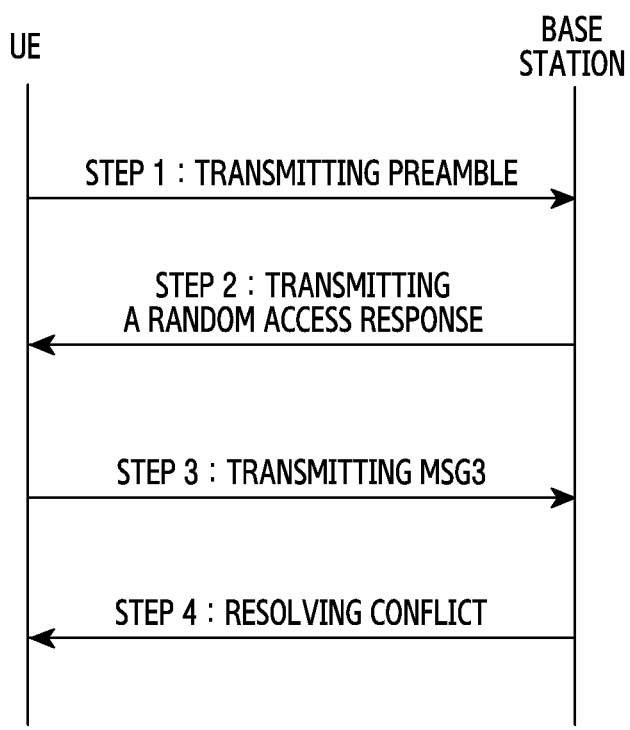
FIG. 1 illustrates a contention-based four-step random access process in the prior art.

Embodiments of the present disclosure are described in detail below, examples of which are illustrated in the accompanying drawings, in which the same or similar reference numbers denote the same or similar elements or elements having the same or similar functions throughout. The embodiments described below with reference to the drawings are exemplary for explaining the present disclosure only, and should not be construed as limiting the present disclosure.

It will be understood by the skilled in the art that singular forms "a", "an", "said" and "the" used herein may also include plural forms, unless specifically stated. It should be further understood that the word "comprising" used in the description of the present disclosure refers to presence of features, integers, steps, operations, elements, and/or components, but does not exclude presence or addition of one or more other features, Integers, steps, operations, elements, components, and/or combinations thereof. It should be understood that when an element is referred to as being "connected" or "coupled" to another element, it can be directly connected or coupled to the other element, or there may also be intermediate elements. In addition, "connected" or "coupled" as used herein may include wirelessly connected or wirelessly coupled. As used herein, the phrase "and/or" includes all or any of one or more of associated listed items, and all of combinations thereof.

It may be understood by the skilled in the art that, unless otherwise defined, all terms (including technical and scientific terms) used herein have the same meaning as commonly understood by the skilled in the art to which the present disclosure belongs. It should also be understood that the terms such as those defined in a general dictionary should be understood as having a meaning that is consistent with that in the context of the prior art, and will not be explained with an idealized or too formal meaning, unless specifically defined herein.

The skilled in the art may understand that the "UE" and "terminal" used herein include not only a wireless signal receiver device, which is a device only having a wireless signal receiver without a transmitting capability, but also a device with receiving and transmitting hardware, which is a device having receiving and transmitting hardware capable of performing a bidirectional communication over a bidirectional communication link. Such a device may include: a cellular or other communication device having a single line display or a multi-line display or a cellular or other communication device without a multi-line display; a Personal Communication Service (PCS), which may combine voice, data processing, fax and/or data communication capabilities; a Personal Digital Assistant (PDA), which may include a Radio Frequency (RF) receiver, a pager, Internet/Intranet access, a web browser, a notepad, a calendar, and/or a Global Positioning System (GPS) receiver; a conventional laptop and/or palmtop computer or other device, which may be a conventional laptop and/or palmtop computer or other device having and/or including an RF receiver. The "terminal", "terminal device" as used herein may be portable, transportable, installed in a vehicle (of aviation, maritime, and/or land), or may be adapted and/or configured to operate locally, and/or may operate in a distributed form on the earth and/or at any other locations in space. The "UE" and "terminal" used herein may also be a communication terminal, an Internet terminal, a music/video playing terminal, such as a PDA, a Mobile Internet Device (MID), and/or a mobile phone having a music/video playback function, or a smart TV, a set-top box and other devices.

A time unit in the present disclosure may be: an OFDM symbol, an OFDM symbol group (consisting of a plurality of OFDM symbols), a time slot, a time slot group (consisting of a plurality of time slots), a subframe, a subframe group (consisting of a plurality of subframes), a system frame, a system frame group (consisting of a plurality of system frames); or may be an absolute time unit, such as 10 ms, 1 ms, 1 s, etc. The time unit may also be a combination of various granularities, such as N1 time slots plus N2 OFDM symbols.

A frequency domain unit in the present disclosure may be: a subcarrier, a subcarrier group (consisting of a plurality of subcarriers), a Resource Block (RB), which may also be referred to as a Physical Resource Block (PRB), a resource block group (consisting of a plurality of RBs), a BandWidth Part (BWP), a BandWidth Part group (consisting of a plurality of BWPs), a band/carrier, a band group/carrier group; or may be an absolute frequency domain unit, such as 1 Hz, 1 kHz, etc. The frequency domain unit may also be a combination of various granularities, such as M1 PRBs plus M2 subcarriers.

In order to make the objects, technical means and advantages of the present disclosure more clear, the present disclosure will be further described in detail below with reference to the accompanying drawings.

In order to facilitate the understanding of the present disclosure, the technical solutions of the present disclosure will be further described in an interactive mode between a UE and a base station in conjunction with specific application scenarios.

In order to achieve faster signal transmission and reception, the present disclosure proposes to transmit a random access preamble along with a data portion (denoted as a "first message"), and then search a downlink channel for feedback (denoted as a "second message") from a network device, and further proposes solutions for how to configure information composition of the first message and the second message, and how to proceed based on the feedback from the network device.

Transmissions in a wireless communication system include: a transmission from a base station (for example, gNB) to a UE (referred to as a downlink transmission), the corresponding time slot being called a downlink time slot; and a transmission from the UE to the base station (referred to as an uplink transmission), the corresponding time slot being called an uplink time slot.

In the downlink communication of the wireless communication system, the system periodically transmits a synchronization signal and a broadcast channel to the UE through a synchronization signal block (SSB, a synchronization signal/PBCH block), and the periodicity is a Synchronization Signal Block periodicity (SSB periodicity), or called an SSB burst periodicity. At the same time, the base station may configure a random access configuration period (Physical Random Access Channel (PRACH) configuration period). A certain number of random access transmission occasions (also called random access occasions, or PRACH transmission occasions, ROs) are configured within the period, and it is satisfied that all SSBs can be mapped to the corresponding ROs within a mapping period (a certain length of time).

In a New Radio (NR) communication system, the performance of the random access directly affects the user's experience, before Radio Resource Control (RRC) is set up, such as in a random access process. In the conventional wireless communication system, such as LTE and LTE-Advanced, the random access process is applied to various scenarios such as an initial connection establishment, a cell handover, an uplink connection reestablishment, an RRC connection reestablishment, etc. According to whether the UE exclusively occupies preamble resources, the random access process is classified to Contention-based Random Access and Contention-free Random Access. In the contention-based random access, each UE selects a preamble from the same preamble resources when attempting to establish an uplink connection. It is possible that multiple UEs select the same preamble and transmit it to the base station. Therefore, a contention resolution mechanism is an important research direction in the random access. How to reduce the probability of contention and how to rapidly resolve contentions that have already occurred are key indicators affecting the performance of the random access.

The contention-based random access process in LTE-A is divided into four steps, as shown in FIG. 1. In Step One, the UE randomly selects a preamble from a preamble resource pool, and transmits the preamble to the base station. The base station performs correlation detection on the received signal to identify the preamble transmitted by the UE. In Step Two, the base station transmits to the UE a Random Access Response (RAR), including a random access preamble identifier, a timing advance instruction determined according to a delay estimation between the UE and the base station, a temporary Cell-Radio Network Temporary Identifier (C-RNTI), and time-frequency resources allocated for the next uplink transmission of the UE. In Step Three, the UE transmits a Third Message (Msg3) to the base station according to the information in the RAR. The Msg3 includes information such as a UE identifier and an RRC connection request etc., wherein the UE identifier is unique to the UE and is used for contention resolution. In Step Four, the base station transmits to the UE a contention resolution identifier, including a UE identifier of the UE that wins in the contention resolution. After the UE detects the identifier of its own, the UE upgrades the temporary C-RNTI to a C-RNTI, and transmits an ACK signal to the base station to complete the random access process and waits for scheduling by the base station. Otherwise, the UE will start a new random access process after a certain delay.

For the contention-free random access process, the base station may assign a preamble to the UE since the base station knows the UE identity. Therefore, when transmitting a preamble, the UE does not need to randomly select the preamble, but uses the assigned preamble. After detecting the assigned preamble, the base station transmits a corresponding random access response, including information such as timing advance and uplink resource allocation, etc. After receiving the random access response, the UE considers that the uplink synchronization has been completed, and waits for further scheduling by the base station. Therefore, the contention-free random access process only includes two steps: Step One is to transmit a preamble; and Step Two is to transmit a random access response.

The random access process in LTE is applicable to the following scenarios:
1. Initial access in RRC_IDLE;
2. Re-establishing the RRC connection;
3. Cell handover;
4. In the RRC connected state, downlink data arrives and a random access process is requested (when the uplink is in non-synchronization);
5. In the RRC connected state, uplink data arrives and a random access process is requested (when the uplink is in non-synchronization or no resources in PUCCH resources are allocated to the scheduling request);
6. Positioning.

For a future communication system, however, for the UE that needs to rapidly access the network or only has a small amount of data to be transmitted to the base station, it is not an efficient transmission method to implement the RRC establishment, resource scheduling request, and then the data transmission in the four-step random access. A method of accessing the network more rapidly or allowing the UE to transmit data more efficiently is desired.

Figure 2:
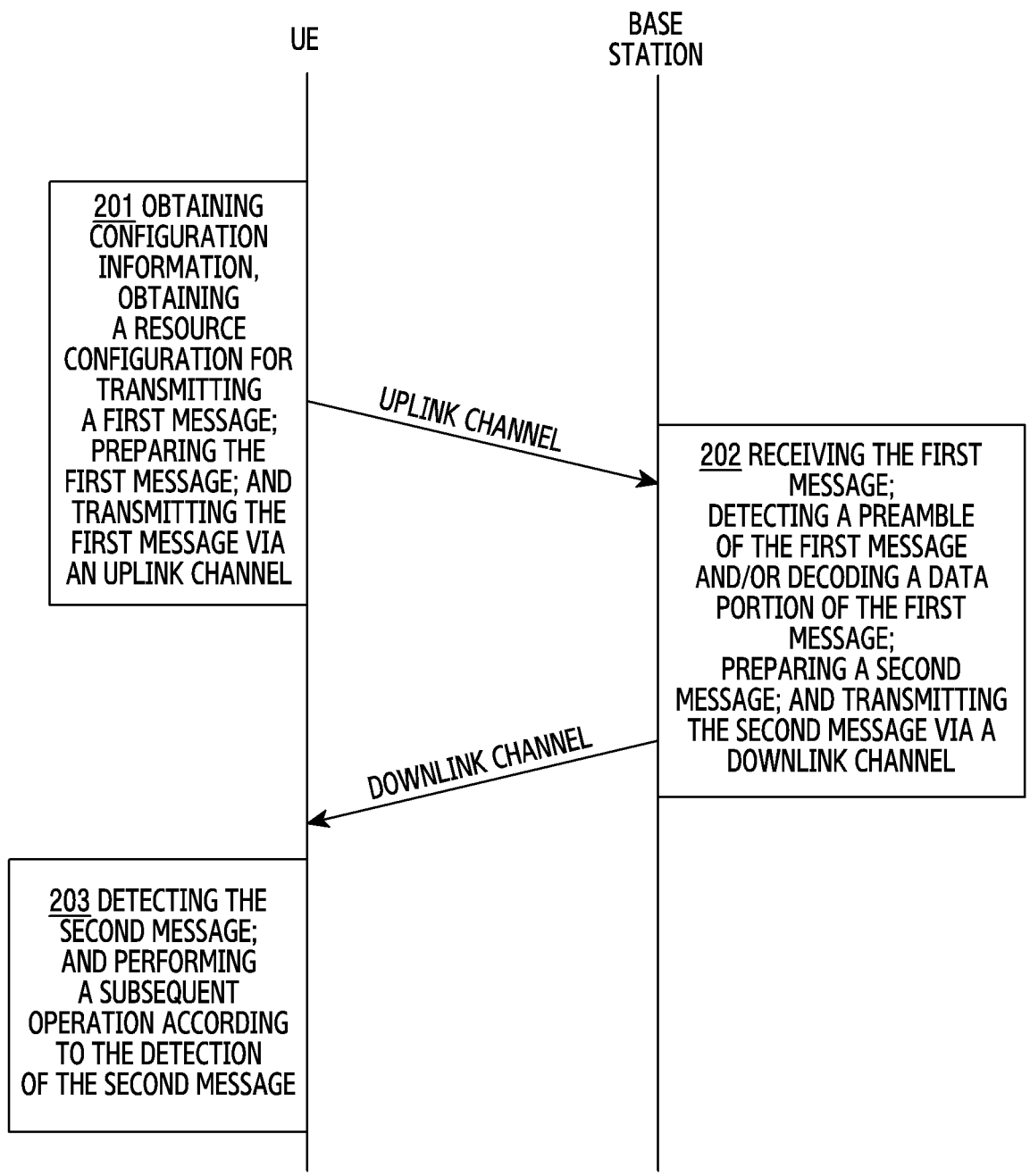
FIG. 2 illustrates a two-step random access process according to an exemplary embodiment of the present disclosure.

FIG. 2 schematically illustrates a two-step random access process according to an exemplary embodiment of the present disclosure.

First, the base station may transmit, to the UE, configuration information for signal transmission and reception according to the present disclosure (called a two-step random access process, or a 2 step RACH process) via a downlink channel (such as a PDCCH, a PDSCH, a Physical Downlink Broadcast CHannel (PBCH)), in System Information (SI), DCI, higher layer control information (such as a RRC configuration message), a handover command message.

As shown in FIG. 2, in 201, the UE obtains the configuration information, determines a resource configuration for transmitting a first message of the two-step random access according to the configuration information, prepares the first message, and transmits the first message via an uplink channel.

In 202, the base station receives the first message, detects a preamble in the first message and/or decodes a data portion of the first message, prepares a second message as feedback of the first message, and transmits the second message via a downlink channel.

In 203, the UE detects the second message from the base station, and performs a subsequent operation, e.g., retransmission of the first message, retransmission of the data in the first message, transmission of new data, or successful completion of the transmission, etc., according to the detection of the second message.

Hereinafter, a flowchart of a method at a UE for signal transmission according to an exemplary embodiment of the present disclosure will be described in detail with reference to FIG. 3.

Figure 3:
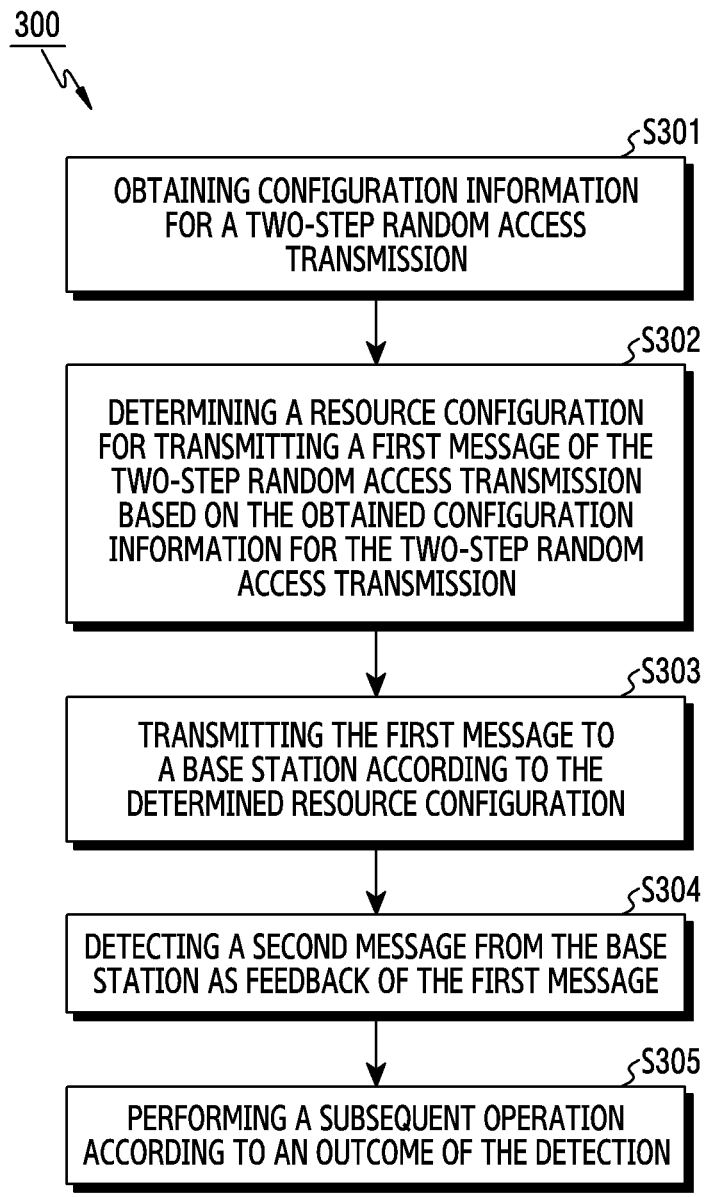
FIG. 3 illustrates a method at a UE for signal transmission according to an exemplary embodiment of the present disclosure.

FIG. 3 schematically illustrates a flowchart of a method 300 at a UE for signal transmission according to an exemplary embodiment of the present disclosure.

As shown in FIG. 3, the method 300 includes steps S301-S303.

In step S301, the UE may obtain configuration information for a two-step random access transmission.

In step S302, the UE may determine a resource configuration for transmitting a first message of the two-step random access transmission based on the obtained configuration information for the two-step random access transmission.

In step S303, the UE may transmit the first message to the base station according to the determined resource configuration.

Specifically, the configuration information for the two-step random access transmission may include at least one of:
(1) A collection of time-frequency resources for the two-step random access transmission, including at least one of:
   (1-1) Time-frequency resources for transmitting the preamble of the two-step random access (2-step-RACH RO),
   (1-2) Time-frequency resources for transmitting the PUSCH of the two-step random access (2-step-RACH PUSCH),
   (1-3) DMRS time-frequency resources in the time-frequency resources (2-step-RACH PUSCH) for transmitting the PUSCH of the two-step random access;
(2) A mapping relationship between two-step random access time-frequency resources and downlink beams;
(3) A resource pool of X-RNTIs for the two-step random access transmission;
(4) A configuration of control resources and/or a configuration of search spaces for searching for feedback of the two-step random access transmission;
(5) A maximum number of transmissions N_max for the two-step random access transmission;
   (5-1) In particular, a BETA value may be configured to represent a ratio of N_max to a maximum number of transmissions N_max_4 for the four-step random access transmission, i.e., N_max=BETA*N_max_4;
(6) A maximum transmission time T_time for the two-step random access transmission;
(7) W available PUCCH resource configurations (e.g., W=16, N=4 bits being used in the second message for indicating the UE to feed back an ACK on the corresponding PUCCH resources after the second message is received), where W and N are positive Integers.

In an exemplary embodiment, the UE may obtain the configuration information for the two-step random access transmission from the system broadcast message (including a primary broadcast message, Remaining Minimum System Information (RMSI) and/or other broadcast messages (OSI)), or the downlink control channel information, or the higher layer control signaling information, or the handover command message of the base station received via the downlink channel.

In an exemplary embodiment, the UE may also obtain configuration information for other random access transmissions, such as configuration information for a four-step random access transmission. In this case, the UE may determine whether to perform the two-step random access transmission or the four-step random access transmission by one of:
(1) determining whether to select the two-step random access transmission or the four-step random access transmission to be performed according to a random access trigger event; for example, the UE performing the two-step random access transmission when the trigger event is a scheduling request; and the UE performing the four-step random access transmission when the trigger event is another event, such as uplink being out of synchronization;
(2) determining whether to select the two-step random access transmission or the four-step random access transmission to be performed according to a service type; for example, the UE performing the two-step random access transmission when the service type is an Ultra-Reliable Low-Latency Communication (URLLC); and the UE performing the four-step random access transmission when the service type is another type, such as enhanced Mobile BroadBand (eMBB), mass Machine Type Communication (mMTC);
(3) determining whether to select the two-step random access transmission or the four-step random access transmission to be performed according to a measured PL and/or RSRP; for example, the UE performing the two-step random access transmission when the measured PL and/or RSRP is higher than (or is not lower than) a predefined or configured threshold value T1; and the UE performing the four-step random access transmission when the measured PL and/or RSRP is not higher than (or is lower than) a predefined or configured threshold value T2; particularly, T1 and T2 being the same threshold;
(4) always preferring to perform the two-step random access transmission;
(5) randomly selecting the two-step random access transmission or the four-step random access transmission;
(6) determining whether to perform the two-step random access transmission or the four-step random access transmission in response to receiving a system message (or DCI, or higher layer control information, or handover command message) notification indication; for example, the UE performing the two-step random access transmission if the RMSI (or DCI, or RRC configuration, or handover command message) indicates to use the two-step random access; otherwise, the UE performing the four-step random access.

In the exemplary embodiment, when the UE determines to perform the two-step random access, step S302 is performed.

In an exemplary embodiment, the first message may include at least one of:
(1) a random access preamble (preamble);
(2) a data portion (PUSCH and/or DMRS), wherein the information carried on the PUSCH may include at least one of:

(2-1) BSR and/or PHR;
(2-1-1) In particular, the BSR and/or PHR may be transmitted in the form of a Medium Access Control Control Element (MAC CE) and/or a MAC Protocol Data Unit (PDU);
(2-2) N-bit UCI, for example, N may be 1 or 2; wherein the content of the UCI may be at least one of:
(2-2-1) an MCS indication;
(2-2-2) a PUSCH transmission position indication; for example, 2-step-RACH PUSCH in the configuration information occupies 2 time units, but the UE selects one of the time units for transmission (for example, when the channel condition of the UE is relatively good, or the amount of data transmission is relatively small, the UE may select only one time unit for transmission in order to reduce power consumption); then notifies the network device by 2-bit information which of the time units the UE selects for transmission or that both of the time units are selected for transmission;
(2-2-3) a Channel Status Information Reference Signal (CSI-RS) indication;
(2-2-4) Hybrid Automatic Repeat Request (HARQ)-ACK feedback.
(3) Other possible information that may be contained in the Msg3 of the conventional four-step random access, such as a UE ID, wherein the UE ID may be at least one of:
(3-1) a C-RNTI;
(3-2) a CCCH SDU (a Service-Temporary Mobile Subscriber Identity (S-TMSI), or a fixed random number, such as N (a positive integer)-bit random number), e.g., N=40;
(3-3) user plane data.

In an exemplary embodiment, the MCS used in the PUSCH may be determined according to at least one of:
(1) content included in the data portion; in this case, for example, there are two MCS settings (represented as MCS 0-1); when BSR, PHR and other data are included, the UE selects a higher MCS, such as MCS1, i.e., a larger modulation order and/or a larger coding rate; when only one type of data (such as BSR) is included, the UE selects a lower MCS, such as MCS0, i.e., a smaller modulation order and/or a smaller coding rate;
(2) the latest measured PL and/or RSRP; in this case, for example, when the measured PL is higher than (or is not lower than) a predefined or configured threshold T1, the UE selects a higher MCS1, i.e., a larger modulation order and/or a larger coding rate; if the measured PL is not higher than (or is lower than) a predefined or configured threshold R2, the UE selects a lower MCS, such as MCS0, i.e., a smaller modulation order and/or a smaller coding rate; in particular, T1 and T2 may be the same threshold.

In an exemplary embodiment, the MCS indication may indicate the MCS configuration by one of:
(1) an N-bit direct indication; for example, a 1-bit MCS indication (indicating 2 MCS configurations) indicates the modulation and coding scheme used in the PUSCH, wherein the above two MCS configurations may be the first two or arbitrarily selected two MCS configurations selected from the existing complete MCS table,
(2) different preamble groups; for example, preamble0~31 in the configuration information received by the UE correspond to MCS0, and preamble32~63 correspond to MCS1; if the UE determines to use MCS0, the UE selects the preamble from preamble0~31; if the UE determines to use MCS1, the UE selects the preamble from preamble32~63;
(3) different bit-level scrambling and/or interleaving groups; for example, reading from the 0-th column of the interleaving in the configuration information received by the UE correspond to MCS 0, and reading from the N-th column corresponds to MCS1; if the UE determines to use MCS0, the UE reads the encoded bits from the 0-th column; if the UE determines to use MCS1, the UE reads the encoded bits from the N-th column.

In an exemplary embodiment, the UCI is modulated and encoded by at least one of:
(1) encoding O UCI bits using RM (Reed-Muller) codes or polar codes;
(2) encoding O UCI bits with RM codes of (16, O) when the O UCI bits are smaller than a first threshold; or encoding the O UCI bits with RM codes of (32, O) when the O UCI bits are not smaller than a second threshold;
(3) encoding O UCI bits with RM codes when the O UCI bits are smaller than a first threshold; or encoding the O UCI bits with polar codes when the O UCI bits are not smaller than a second threshold;
(4) determining a modulation order of the UCI according to a modulation order of the PUSCH,
where O is a positive integer.

Figure 4:
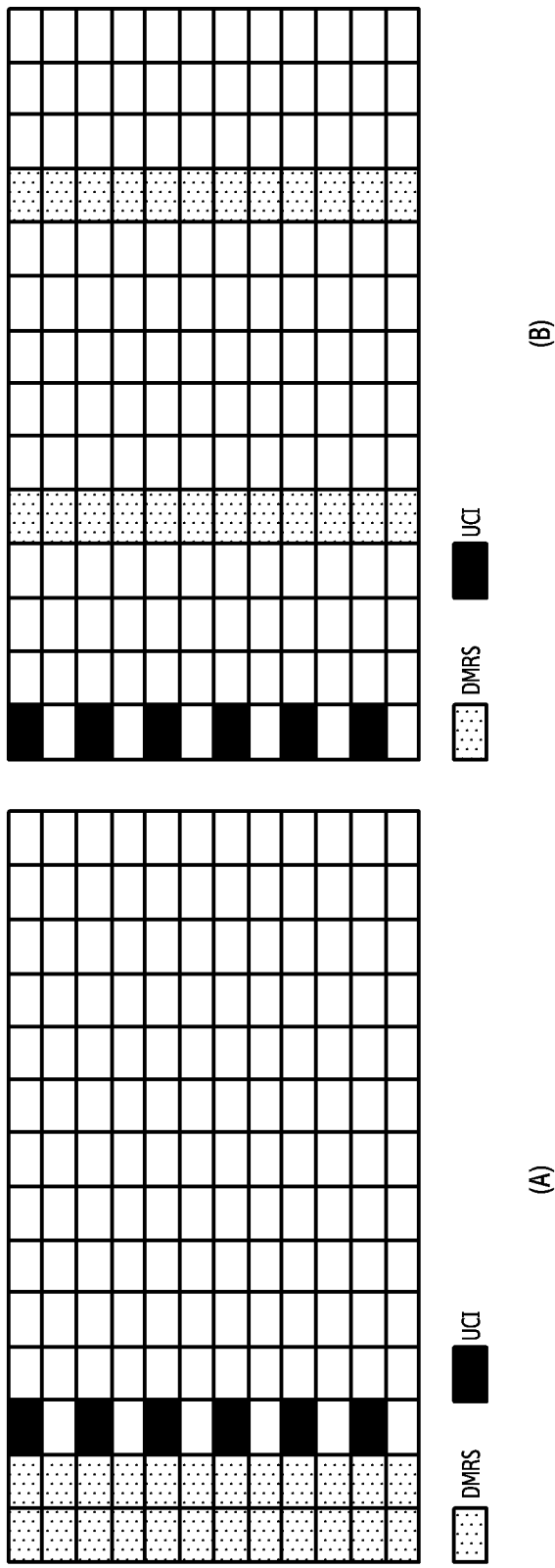
FIG. 4 illustrates an exemplary diagram of a UCI Modulated Symbol Mapping Method One according to an exemplary embodiment of the present disclosure.
Figure 5:
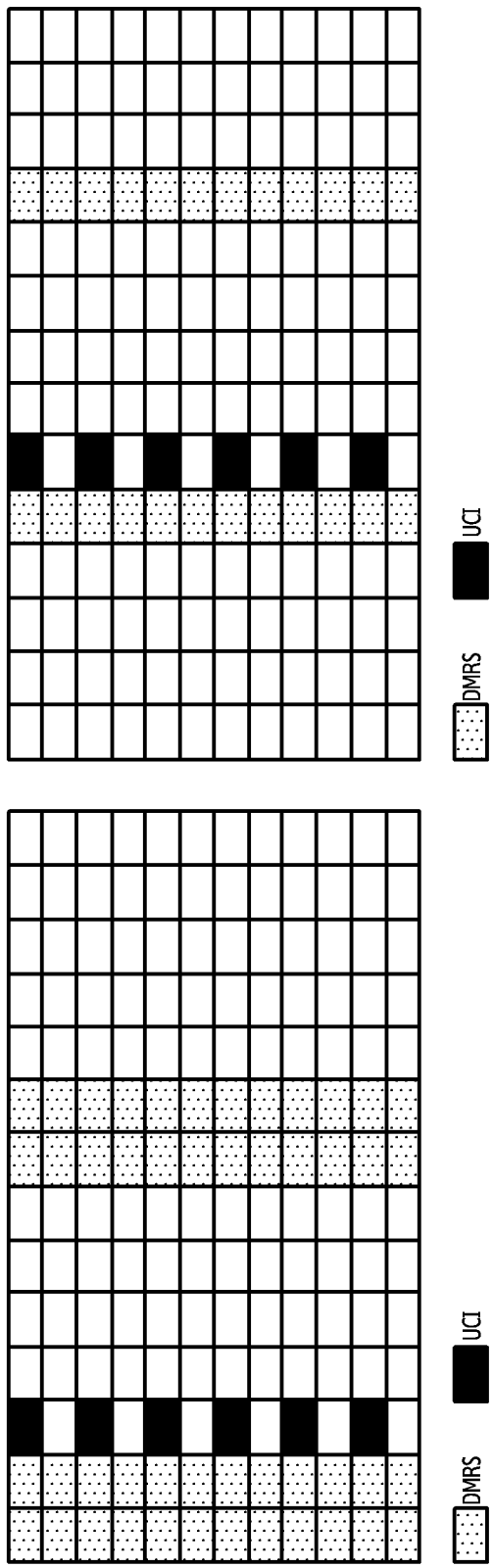
FIG. 5 illustrates an example diagram of a UCI Modulated Symbol Mapping Method Two according to an exemplary embodiment of the present disclosure.
Figure 6:
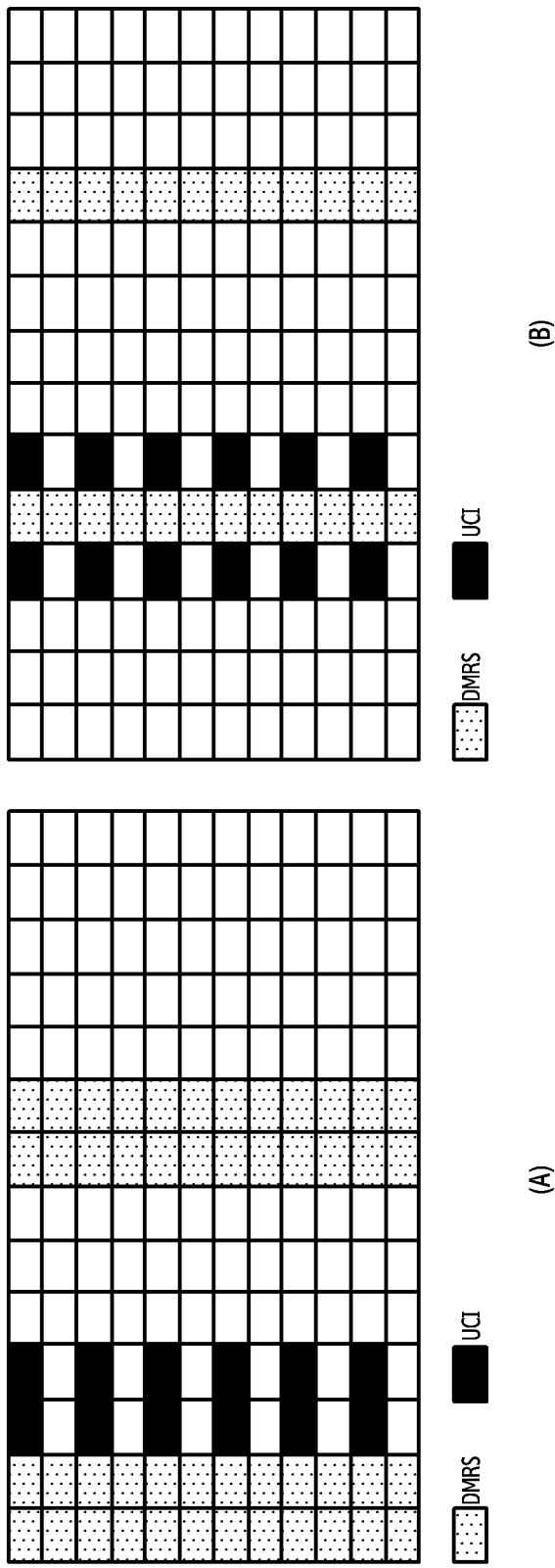
FIG. 6 illustrates an example diagram of a UCI Modulated Symbol Mapping Method Three according to an exemplary embodiment of the present disclosure.

In an exemplary embodiment, an RE mapping scheme of the UCI may include at least one of:
(1) modulated symbols of the UCI being mapped onto available REs according to a principle of frequency domain first (or time domain first).
(2) modulated symbols of the UCI being mapped to REs in an equally-spaced, discrete manner when the modulated symbols of the UCI are smaller than a number of REs available on one time unit, wherein the value of the space is configured by the system, or is calculated in a certain way by the UE;
(3) no rate matching being performed on REs of the PUSCH and modulated symbols of the PUSCH being directly punctured on the REs originally occupied by the modulated symbols of the UCI, when a number of modulated symbols of the UCI is smaller than (or is not larger than) a first threshold T1; or rate matching being performed on PUSCH data, when the number of modulated symbols is not smaller than (or is larger than) a second threshold T2; in particular, T1 and T2 may be the same threshold;
(4) modulated symbols of the UCI being sequentially mapped onto OFDM symbols from the first non-DMRS symbol; FIG. 4 shows an exemplary UCI modulated symbol mapping method, wherein the modulated symbols of the UCI are sequentially mapped onto the OFDM symbols from the first non-DMRS symbol, no matter whether the DMRS pattern is positioned at the beginning, or in the middle of the symbols of the PUSCH;
(5) modulated symbols of the UCI being sequentially mapped onto OFDM symbols from the first non-DMRS symbol after (or before) the first DMRS symbol; particularly, when a plurality of DMRS symbols are placed consecutively, the modulated symbols of the UCI being sequentially mapped onto the OFDM symbols from the first non-DMRS symbol after (or before) the last one of the first consecutive plurality of DMRS symbols. FIG. 5 illustrates another exemplary UCI modulated symbol mapping method, in which the mapping is performed sequentially after the first DMRS symbol;

(6) modulated symbols of the UCI being sequentially mapped onto OFDM symbols from a non-DMRS symbol closest to the first DMRS symbol, i.e., sequentially mapped onto the OFDM symbols from a previous non-DMRS symbol adjacent to the DMRS symbol to the OFDM symbols of a next non-DMRS symbol adjacent to the DMRS symbol, when the modulated symbols of the UCI occupy a plurality of time units, such as OFDM symbols; particularly, when the DMRS symbol is positioned at the beginning, the modulated symbols of the UCI being sequentially mapped onto the OFDM symbols from the next non-DMRS symbol adjacent to the DMRS symbol, as shown in FIG. 6;

(7) multiple pieces of information being placed in a predefined priority order when the multiple pieces of information are included in the UCI. For example, the multiple pieces of information may include at least: an MCS indication, a PUSCH transmission position indication, a CSI report, and a HARQ-ACK indication. Then, the multiple pieces of information may be placed in such a way that, for example, the first is the MC, the second is the PUSCH transmission position indication, the third is the CSI report, and the last is the HARQ-ACK indication.

Figure 10:
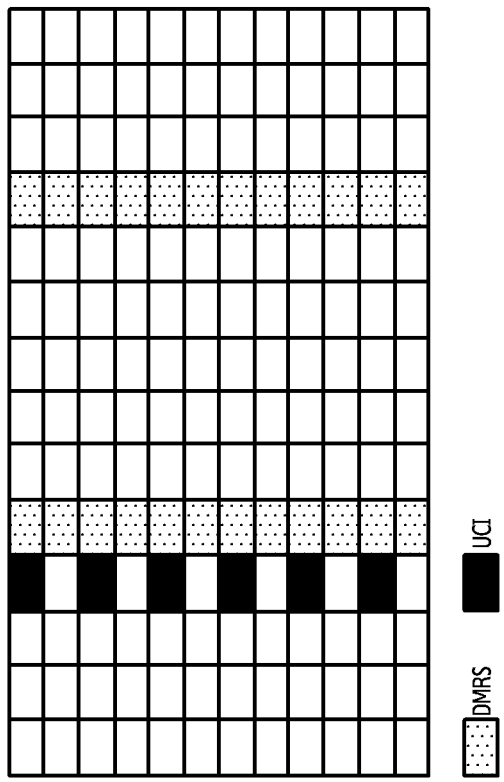
FIG. 10 illustrates an exemplary diagram of determining a RE mapping manner according to a DMRS configuration.
Figure 10:
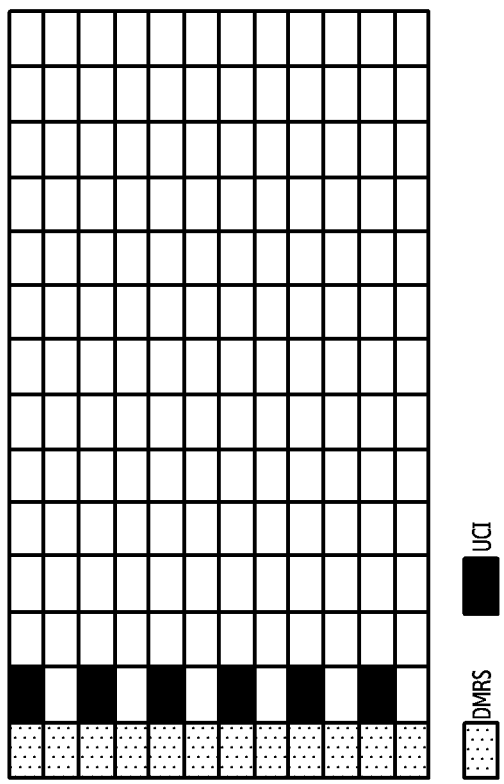

(8) In particular, when the UE has various different RE mapping schemes, the corresponding RE mapping schemes of the UCI may be selected based on different DMRS configurations (e.g., different DMRS types, and/or different DMRS port indexes or index groups). For example, when the configured DMRS is Type A (e.g., the DMRS symbol is not the first symbol of the PUSCH), the UE maps the UCI modulated symbols sequentially onto the OFDM symbols from the first non-DMRS symbol before the first DMRS symbol; and when the configured DMRS is Type B (e.g., the DMRS symbol is the first symbol of the PUSCH), the UE maps the modulated symbols of the UCI sequentially onto the OFDM symbols from the first non-DMRS symbol, as shown in FIG. 10.

The UE determines the resource position of the first message to be transmitted and the content of the first message to be transmitted, and transmits the first message after power control. If the UE transmits the random access preamble and the data portion of the first message simultaneously, the UE may first determine the transmit beam of the preamble, and then set the transmit beam of the data portion to be identical to the transmit beam of the preamble, that is, the spatial domain transmission filter for transmitting the data portion is set according to the spatial domain transmission filter for transmitting the random access preamble.

The method 300 also includes steps S304 and S305.

In step S304, the UE may detect a second message from the base station as feedback of the first message.

In step S305, the UE performs a subsequent operation according to an outcome of the detection.

In an exemplary embodiment, the UE may take the first available control resource set and/or search space N time units after the last time unit in the first message as the starting position. The UE starts searching for and detecting the possible second message in the available control resource set and/or search space within the random access response detection window with a length of W time units, wherein the UE determines M X-RNTIs for searching for and detecting the possible second message (for example, the determined X-RNTIs are used to descramble the CRC of the received PDCCH; if the decoding is successful, it shows that a correct PDCCH is searched and detected; otherwise, it shows that a correct PDCCH is searched and detected). The UE may determine the X-RNTIs by an X-RNTI resource pool given in the configuration information of the network device, or by the determined resource information of the transmitted first message (including the time position information and/or frequency domain position information and/or index information of the preamble), or by the determined content information (e.g., the transmitted C-RNTI) of the transmitted first message, where M is a positive integer.

In an exemplary embodiment, M=1, i.e., the UE determines one X-RNTI for searching for and detecting a second message that is possible to be used as the feedback of the first message.

In an exemplary implementation, if the UE includes the C-RNTI in the first message, the UE may use the C-RNTI included in the first message, as the X-RNTI for detecting the second message of the two-step random access, to search for and detect the possible second message.

In this implementation, if the UE detects the correct PDCCH, the first message is correctly received by the base station, and the UE performs the subsequent operations according to the information carried in the DCI obtained from the PDCCH.

Specifically, the subsequent operations may include at least one of:

(1) the UE continuing transmission of new data if the UE detects that an uplink grant (UL grant) is carried in the DCI; particularly, the transmission of the new data may also represent retransmission of other data; for example, when the UE has a plurality of HARQ processes, the UE may also detect the HARQ process ID in the DCI, then the UE may perform retransmission of the data of the detected HARQ process ID, or transmission of the new data; particularly, when the UE carries in the detected DCI or the higher layer configuration information (e.g., the system information) a frequency hopping indication, and when the frequency hopping indication is configured to be enabled, the UE interprets the time-frequency resource configuration in the uplink grant according to the frequency hopping mode (intra-slot or inter-slot) and the frequency domain offset (or frequencyHoppingOffset, or frequency offset) configured in the detected DCI or the higher layer configuration information (such as the system information); particularly, when the UE carries in the detected DCI or the higher layer configuration information (such as the system information) a BWP index and/or a repetition indication, the UE transmits, on the indicated BWP and/or according to the indicated number of repetitions and repetition manners, the data on the time-frequency resources indicated by the uplink grant;

(2) the UE feeding back an ACK on the corresponding PUCCH resources after receiving the second message, if the UE detects that the N-bit PUCCH resource indication is carried in the DCI.

If the UE does not detect the correct PDCCH in the detection window, the first message of the UE is not correctly received by the base station, and the subsequent operations performed by the UE may include at least one of:

(1) falling back to the four-step random access process; particularly, the UE falls back to retransmit the preamble (i.e., Msg 1 of the four-step random access), and the UE performs resource selection for the random access preamble transmission and the subsequent feedback searching, according to the resource configuration of the four-step random access; particularly, the UE may perform the following operations:
(1-1) resetting the random access preamble transmission counter to be 0; or
(1-2) incrementing the random access preamble transmission counter by 1; if the configured maximum allowable number of transmissions (for the two-step random access or the four-step random access) is not exceeded, and/or the preamble transmission timer has not expired, the UE falling back to the four-step random access process;
(2) incrementing the random access preamble transmission counter by 1; particularly, if the configured maximum allowable number of transmissions is not exceeded and/or the preamble transmission timer has not expired, the UE performing the next two-step random access transmission; if the configured maximum allowable number of transmissions is exceeded and/or the preamble transmission timer has expired, the UE reporting the random access problem or falling back to the four-step random access process.

In another exemplary implementation, if the UE detects the correct PDCCH using the X-RNTI, the UE performs the subsequent operations according to the information carried in the DCI obtained from the PDCCH.
(1) If the UE detects that a contention resolution identifier is carried in the DCI, then
(1-1) if the detected contention resolution identifier is correctly matched with the UE ID uploaded by the UE, the first message is correctly received by the base station, and the UE performs the subsequent operations according to the information carried in the DCI.

Specifically, the subsequent operations may include at least one of:
(1-1-1) if the UE detects that the uplink grant is carried in the DCI, the UE continuing transmission of new data; particularly, the transmission of the new data may also represent retransmission of other data; for example, when the UE has a plurality of HARQ processes, the UE may also detect the HARQ process ID in the DCI, then the UE may perform retransmission of the data of the detected HARQ process ID, or transmission of the new data; particularly, when the UE carries in the detected DCI or the higher layer configuration information (e.g., the system information) a frequency hopping indication, and when the frequency hopping indication is configured to be enabled, the UE follows the frequency hopping mode (intra-slot or inter-slot) and the frequency domain offset (or frequencyHoppingOffset, or frequency offset) configured in the detected DCI or the higher layer configuration information (such as the system information) in the uplink grant; particularly, when the UE carries in the detected DCI or the higher layer configuration information (such as the system information) a BWP index and/or a repetition indication, the UE transmits, on the indicated BWP and/or according to the indicated number of repetitions and repetition manners, the data on the time-frequency resources indicated by the uplink grant. For example, when the UE ID included by the UE in the transmitted PUSCH is the C-RNTI, the UE detects that the DCI uses the C-RNTI, and detects the UL grant in the DCI, that is, the UE considers that the preamble is correctly detected, and the PUSCH is correctly detected and decoded, then the UE may ignore the frequency hopping indication configuration (e.g., whether it is enabled, the frequency domain offset, etc.) of the previous RRC configuration (e.g., the UE-specific RRC configuration), and the UE follows the frequency hopping indication carried in the detected DCI or higher layer configuration information (such as the system information); when the frequency hopping indication is configured to be enabled, the UE interprets the time-frequency resource configuration in the uplink grant according to the frequency hopping mode (intra-slot or inter-slot) and the frequency domain offset (or frequencyHoppingOffset, or frequency offset) configured in the detected DCI or the higher layer configuration information (such as the system information); particularly, when the UE carries in the detected DCI or the higher layer configuration information (such as the system information) a BWP index and/or a repetition indication, the UE transmits, on the indicated BWP and/or according to the indicated number of repetitions and repetition manners, the data on the time-frequency resources indicated by the uplink grant;
(1-1-2) if the UE detects that the temporary C-RNTI is carried in the DCI, the UE setting the temporary C-RNTI to a C-RNTI, or ignoring the temporary C-RNTI;
(1-1-3) if the UE detects that the timing advance value is carried in the DCI, the UE calculating a timing advance amount required by the subsequent uplink transmission based on the timing advance value;
(1-1-4) if the UE detects that the N-bit PUCCH resource indication is carried in the DCI, the UE feeding back an ACK on the corresponding PUCCH resources after the second message is received.
(1-2) if the detected contention resolution identifier is not matched with the UE ID uploaded by the UE, the first message is not correctly received by the base station, and the UE may perform at least one of the following operations:
(1-2-1) stopping detecting other possible second messages in the detection window;
(1-2-2) falling back to the four-step random access process; particularly, the UE falls back to retransmit the preamble (i.e., Msg 1 of the four-step random access), and the UE performs resource selection for the random access preamble transmission and the subsequent feedback searching, according to the resource configuration of the four-step random access; particularly, the UE may perform at least one of the following operations:
(1-2-2-1) resetting the random access preamble transmission counter to be 0;
(1-2-2-2) incrementing the random access preamble transmission counter by 1; if the configured maximum allowable number of transmissions (for the two-step random access or the four-step random access) is not exceeded, and/or the preamble transmission timer has not expired, the UE falling back to the four-step random access process;
(1-2-3) incrementing the random access preamble transmission counter by 1; if the configured maximum allowable number of transmissions is not exceeded and/or the preamble transmission timer has not expired, the UE performing the next two-step random access transmission; if the configured maximum allowable number of transmissions is exceeded and/or the preamble transmission timer has expired, the UE reporting the random access problem or falling back to the four-step random access process;
(1-2-4) continuing to detect other possible second messages in the detection window.

Figure 11:
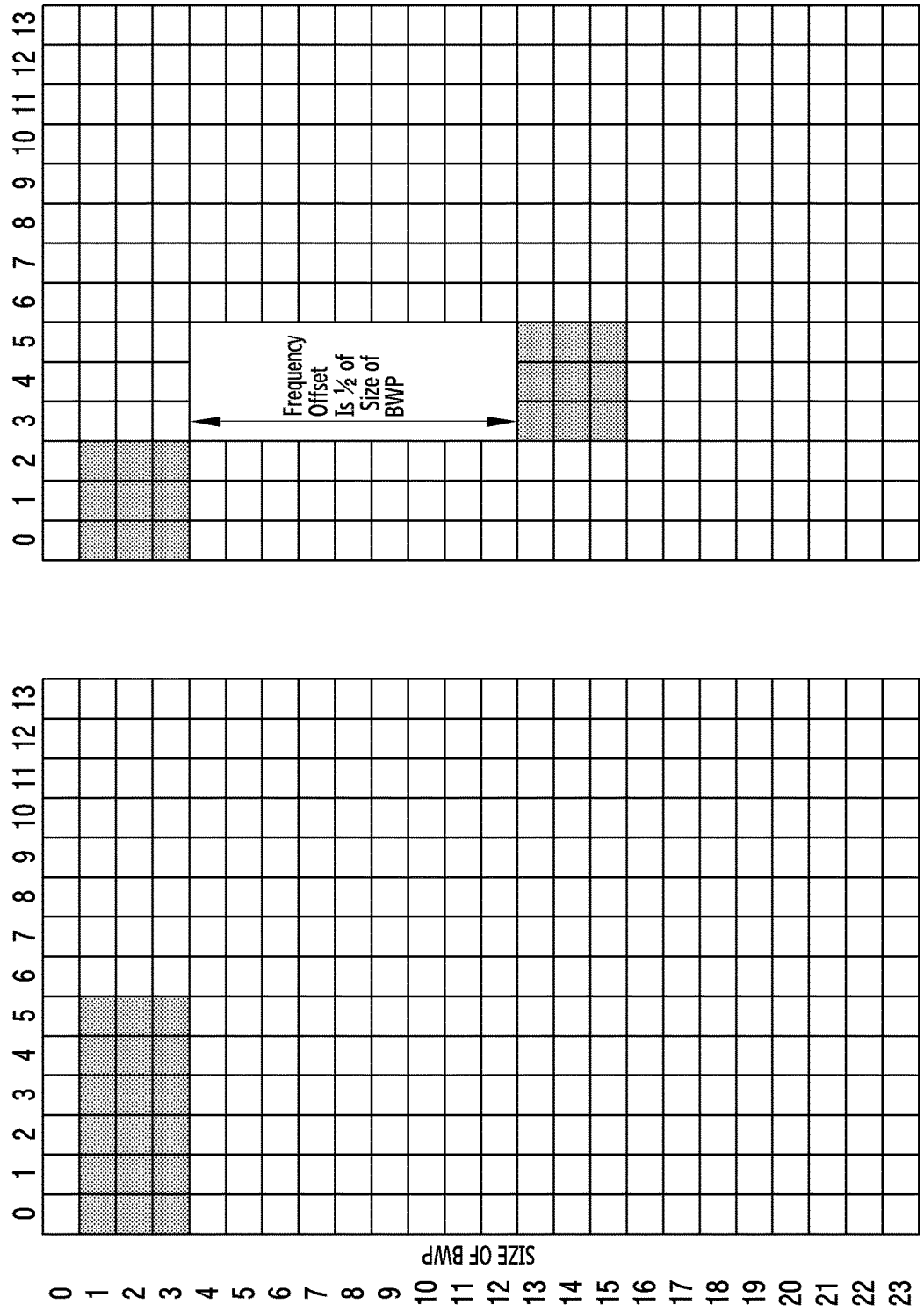
FIG. 11 illustrates an exemplary diagram of intra-slot frequency hopping according to an exemplary embodiment of the present disclosure.

(2) If the UE detects that scheduling information for the downlink transmission is carried in the DCI, the UE receives the PDSCH according to the scheduling information, wherein the PDSCH may include at least one of:
(2-1) one or more detected random access preamble indexes;
(2-1-1) When the UE determines that the detected random access preamble index is matched with the preamble index transmitted by the UE in the first message, the UE detects that the corresponding PDSCH further includes one or more random access responses (RARs)
(2-1-1-1) If the one or more random access responses carry the contention resolution identifier, if the detected contention resolution identifier is correctly matched with the UE ID uploaded by the UE, the first message is correctly received by the network device, and the UE performs the subsequent operations according to the information carried in the RAR.
(2-1-2) Specifically, the subsequent operation may include at least one of:
(2-1-2-1) the UE continuing transmission of new data if the UE detects that an uplink grant (UL grant) is carried in the DCI; particularly, the transmission of the new data may also represent retransmission of other data; for example, when the UE has a plurality of HARQ processes, the UE may also detect the HARQ process ID in the DCI, then the UE may perform retransmission of the data of the detected HARQ process ID, or transmission of the new data; particularly, when the UE carries in the detected DCI or the higher layer configuration information (e.g., the system information) a frequency hopping indication, and when the frequency hopping indication is configured to be enabled, the UE interprets the time-frequency resource configuration in the uplink grant according to the frequency hopping mode (intra-slot or inter-slot) and the frequency domain offset (or frequencyHoppingOffset, or frequency offset) configured in the detected DCI or the higher layer configuration information (such as the system information); particularly, when the UE carries in the detected DCI or the higher layer configuration information (such as the system information) a BWP index and/or a repetition indication, the UE transmits, on the indicated BWP and/or according to the indicated number of repetitions and repetition manners, the data on the time-frequency resources indicated by the uplink grant; For example, when the UE ID included by the UE in the transmitted PUSCH is the C-RNTI, the UE detects the matched RAP ID, detects the UL grant in the RAR, and has the matched contention resolution ID, i.e., the UE considers that the preamble is correctly detected, and the PUSCH is correctly detected and decoded, then the UE may ignore the frequency hopping indication configuration (e.g., whether it is enabled, the frequency domain offset, etc.) of the previous RRC configuration (e.g., the UE-specific RRC configuration), and the UE follows the frequency hopping indication carried in the detected DCI or higher layer configuration information (such as the system information); when the frequency hopping indication is configured to be enabled, the UE interprets the time-frequency resource configuration in the uplink grant according to the frequency hopping mode (intra-slot or inter-slot) and the frequency domain offset (or frequencyHoppingOffset, or frequency offset) configured in the detected DCI or the higher layer configuration information (such as the system information); particularly, when the UE carries in the detected DCI or the higher layer configuration information (such as the system information) a BWP index and/or a repetition indication, the UE transmits, on the indicated BWP and/or according to the indicated number of repetitions and repetition manners, the data on the time-frequency resources indicated by the uplink grant;
(2-1-2-2) if the UE detects that the temporary C-RNTI is carried in the DCI, the UE setting the temporary C-RNTI to a C-RNTI, or ignoring the temporary C-RNTI;
(2-1-2-3) if the UE detects that the timing advance value is carried in the DCI, the UE calculating a timing advance amount required by the subsequent uplink transmission based on the timing advance value;
(2-1-2-4) if the UE detects that the N-bit PUCCH resource indication is carried in the DCI, the UE feeding back an ACK on the corresponding PUCCH resources after the second message is received.
(3) If the contention resolution identifier detected in one or more RARs is not matched with the UE ID uploaded by the UE, the first message is not correctly received by the base station, and the UE may perform at least one of the following operations:
(3-1) stopping detecting other possible second messages in the detection window;
(3-2) falling back to the four-step random access process; particularly, the UE falls back to retransmit the preamble (i.e., Msg 1 of the four-step random access), and the UE performs resource selection for the random access preamble transmission and the subsequent feedback searching, according to the resource configuration of the four-step random access; particularly, the UE may perform at least one of the following operations:
(3-2-1) resetting the random access preamble transmission counter to be 0; or
(3-2-2) incrementing the random access preamble transmission counter by 1; if the configured maximum allowable number of transmissions (for the two-step random access or the four-step random access) is not exceeded, and/or the preamble transmission timer has not expired, the UE falling back to the four-step random access process;
(3-3) incrementing the random access preamble transmission counter by 1; if the configured maximum allowable number of transmissions is not exceeded and/or the preamble transmission timer has not expired, the UE performing the next two-step random access transmission; if the configured maximum allowable number of transmissions is exceeded and/or the preamble transmission timer has expired, the UE reporting the random access problem or falling back to the four-step random access process;
(3-4) continuing to detect other possible feedback second messages in the detection window.
(4) If no contention resolution identifier is detected in one or more RARs (and/or a preconfigured value, such as all 0s or all 1s, is detected in the one or more RARs, indicating no contention resolution identifier), the UE considers that the transmitted preamble is detected, but the data portion is not correctly detected, and the UE may perform at least one of the following operations:
(4-1) stopping detecting other possible second messages in the detection window;
(4-2) falling back to the four-step random access process;
(5) If it is detected that an uplink grant is carried in the RAR, the UE uses the uplink grant to (re)transmit the data portion of the first message (i.e., Msg3 of the four-step random access); particularly, when the UE is detecting The frequency hopping indication is carried in the DCI or in the RAR or in the high-level configuration information (such as the system information). When the frequency hopping indication is configured to be enabled, the UE is in the uplink permission according to the detected DCI or RAR or It is a frequency hopping mode (intra-slot in time slot or inter-slot in time slot) and a frequency domain offset (frequency-HoppingOffset, or frequency offset) configured in high-level configuration information (such as system information); for example, in an example as shown in FIG. 10, when the UE ID included by the UE in the transmitted PUSCH is the C-RNTI, the UE detects the matched RAP ID, detects the UL grant in the RAR, and has no contention resolution ID, i.e., the UE considers that the preamble is correctly detected, and the PUSCH is not correctly detected and decoded, then the UE may ignore the frequency hopping indication configuration (e.g., whether it is enabled, the frequency domain offset, etc.) of the previous RRC configuration (e.g., the UE-specific RRC configuration), and the UE transmits on the time-frequency resources indicated in the corresponding UL grant according to the frequency hopping indication carried in the DCI or RAR or higher layer configuration information (such as the system information). As shown in the left diagram of FIG. 11, if the frequency hopping is not enabled, the UE interprets the time-frequency resource configuration as transmitting the signal in OFDM symbols 0~5 in the time domain and PRBs 1~3 in the frequency domain; as shown in the right diagram of FIG. 11, if the frequency hopping is enabled and the frequency domain offset is a half of the BWP size, the UE interprets the time-frequency resource configuration as the first hop transmitting the signal on the first three OFDM symbols and PRBs 1~3, and the second hop transmitting the signal on OFDM symbols 3~5 and PRBs 13~15.

Figure 12:
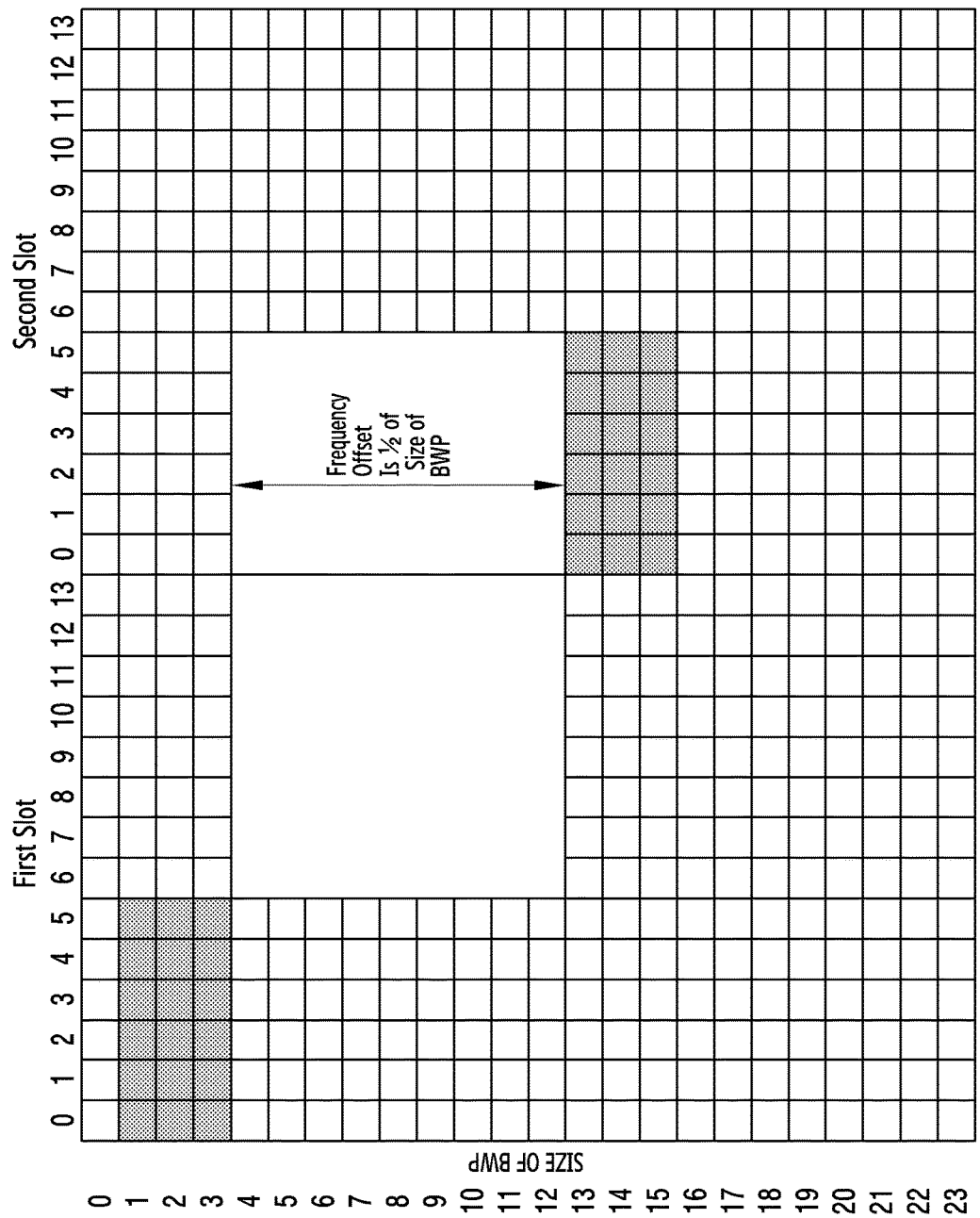
FIG. 12 illustrates an exemplary diagram of inter-slot frequency hopping according to an exemplary embodiment of the present disclosure.

(6) If the transmission is the multi-slot transmission, the inter-slot frequency hopping is configured (as shown in FIG. 12), and the UE interprets the time-frequency resource configuration as the first hop transmitting the signal on OFDM symbols 0~5 of the first time slot and PRBs 1~3, and the second hop transmitting the signal on OFDM symbols 0~5 of the second time slot and PRBs 13~15.

(6-1) Particularly, when the UE carries the BWP index and/or repetition indication in the detected DCI or higher layer configuration information (such as system information), the UE transmits, on the indicated BWP and/or according to the indicated number of repetitions and repetition manners, the data on the time-frequency resources indicated by the uplink grant;

(7) If it is detected that the temporary C-RNTI is carried in the RAR, the UE uses the temporary C-RNTI or X-RNTI to search for the subsequent retransmission PDCCH of the Msg 3 and/or PDCCH of the Msg 4.

(8) If it is detected that the timing advance value is carried in the RAR, the UE calculates the timing advance amount required by the subsequent uplink transmission (including the Msg 3) based on the timing advance value;

(8-1) The UE falls back to retransmit the preamble (i.e., Msg 1 of the four-step random access), and the UE performs resource selection for the random access preamble transmission and the subsequent feedback searching, according to the resource configuration of the four-step random access; particularly, the UE may perform the following operations:

(8-1-1) resetting the random access preamble transmission counter to be 0; or (8-1-2) incrementing the random access preamble transmission counter by 1; if the configured maximum allowable number of transmissions (for the two-step random access or the four-step random access) is not exceeded, and/or the preamble transmission timer has not expired, the UE falling back to the four-step random access process;

(8-1-3) incrementing the random access preamble transmission counter by 1; particularly, if the configured maximum allowable number of transmissions is not exceeded and/or the preamble transmission timer has not expired, the UE performing the next two-step random access transmission; if the configured maximum allowable number of transmissions is exceeded and/or the preamble transmission timer has expired, the UE reporting the random access problem or falling back to the four-step random access process.

(8-1-4) continuing to detect other possible second messages in the detection window.

When the UE determines that the detected random access preamble index is not matched with the preamble index transmitted by the UE in the first message, the UE may perform at least one of:

(1) stopping detecting other possible second messages in the detection window;

(2) falling back to the four-step random access process; particularly, the UE falls back to retransmit the preamble (i.e., Msg 1 of the four-step random access), and the UE performs resource selection for the random access preamble transmission and the subsequent feedback searching, according to the resource configuration of the four-step random access;

(3) incrementing the random access preamble transmission counter by 1; if the configured maximum allowable number of transmissions is not exceeded and/or the preamble transmission timer has not expired, the UE performing the next two-step random access transmission; if the configured maximum allowable number of transmissions is exceeded and/or the preamble transmission timer has expired, the UE reporting the random access problem or falling back to the four-step random access process.

(4) continuing to detect other possible second messages in the detection window.

If the UE does not detect the correct PDCCH in the entire detection window using the X-RNTI, the UE may perform at least one of:

(1) falling back to the four-step random access process; particularly, the UE falls back to re-transmit the preamble (i.e., Msg 1 of the four-step random access), and the UE performs resource selection for the random access preamble transmission and the subsequent feedback searching, according to the resource configuration of the four-step random access;

(2) incrementing the random access preamble transmission counter by 1; if the configured maximum allowable number of transmissions is not exceeded and/or the preamble transmission timer has not expired, the UE performing the next two-step random access transmission; if the configured maximum allowable number of transmissions is exceeded and/or the preamble transmission timer has expired, the UE reporting the random access problem or falling back to the four-step random access process.

In another exemplary embodiment, M=2, that is, the UE determines that 2 X-RNTIs are used to search for the possible second messages, one being represented as XRNTI-2 (for detecting the second message of the two-step random access, the other being represented as X-RNTI-4 (for detecting the second message of the four-step random access).

The processing method of the UE using the X-RNTI-2 to search for the possible second message is the same as that of the UE in case of M=1, and thus details thereof will not be described herein again.

When the UE does not detect the correct PDCCH using the X-RNTI-2, or does not detect the matched contention resolution identifier, or does not detect the matched random access preamble index, the UE may switch to use the X-RNTI-4 to detect the possible second message. The processing method of the UE using the X-RNTI-4 to search for the possible second message is the same as that of searching for the random access response in the conventional four-step random access process, and thus details thereof will not be described herein again.

In the second searched message (i.e., the corresponding PDCCH and/or PDSCH), the UE may also detect a Fallback Indicator (FI), for example, in the MAC subheader, including N (for example, N=1, 2)-bit fallback indication, wherein
(1) If N=1, then if the UE detects FI=1 (or 0, or True, or Enabled), the UE fall back to the four-step random access process; otherwise, the UE continues to stay in the two-step random access process; or
(2) FI represents $2^N$ (representing 2 to the power of N) possible values (for example, FI_0, FI_1, . . . FI_i; FI_$2^N$). If the FI in the network configuration received by the UE is set to be FI_i, the UE randomly selects a number X from 0~1. If X is greater than (i.e., is not smaller than) FI_i, the UE continues to stay in the two-step random access process; if X is not greater than (i.e., is smaller than) FI_i, the UE falls back to the four-step random access process;

If the UE detects a Backoff Indicator (BI) in the second message (i.e., the corresponding PDCCH, and/or the PDSCH), the UE may ignore the BI when the UE needs to fall back to the four-step random access; or the UE may generate a random number T of time units. If T>X, the UE transmits the Msg 1 in the four-step random access using the first available RO after T; when the UE needs to continue the two-step random access, the UE may ignore the BI; or the UE may generate a random number T of time units. If T>X, the UE transmits the first message in the two-step random access on the first available two-step random access time-frequency resource after T.

Figure 7:
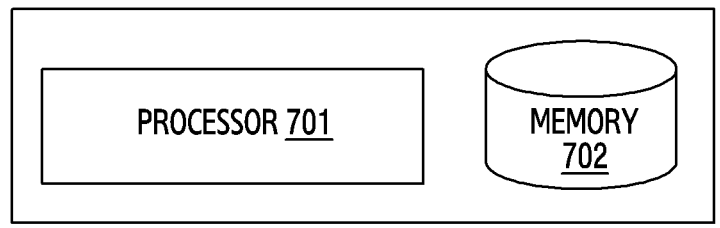
FIG. 7 illustrates a structure block diagram of a UE according to an exemplary embodiment of the present disclosure.

FIG. 7 schematically shows a schematic structure diagram of a UE according to an embodiment of the present disclosure.

The UE 700 may be used to perform the method 300 described with reference to FIG. 3.

As shown in FIG. 7, the UE 700 includes a processing unit or processor 701, which may be a single unit or a combination of multiple units for performing different steps of the method; a memory 703 in which computer executable instructions are stored, the instructions, when executed by the processor 1102, cause the UE 700 to perform the method 300. For the sake of brevity, only the schematic structure of the UE according to an exemplary embodiment of the present disclosure will be described herein, and details which have been described previously in the method 300 with reference to FIG. 3 will be omitted.

The instructions, when executed by the processor 701, cause the UE 700 to:
obtain configuration information for a two-step random access transmission;
determine a resource configuration for transmitting a first message of the two-step random access transmission based on the obtained configuration information for the two-step random access transmission, wherein the first message includes a preamble and/or data;
transmit the first message to a base station according to the determined resource configuration;
detect a second message from the base station as feedback of the first message; and
perform a subsequent operation according to an outcome of the detection.

In an exemplary embodiment, the second message includes at least one of:
(1) a contention resolution identifier,
(2) an uplink grant,
(3) a temporary C-RNTI,
(4) a timing advance value,
(5) a PUCCH resource indication,
(6) scheduling information for a downlink transmission,
(7) a fallback indicator,
(8) a backoff indicator.

In an exemplary embodiment, the data includes a PUSCH and/or a DMRS,
wherein information carried on the PUSCH includes at least one of:
(1) a BSR and/or PHR,
(2) UCI,
(3) a UE ID, wherein the UE ID includes a C-RNTI and/or a CCCH SDU,
(4) user plane data.

In an exemplary embodiment, the UCI includes at least one of:
(1) a Modulation and Coding Scheme (MCS) indication for indicating an MCS used to transmit PUSCH,
(2) a PUSCH transmission position indication.

In an exemplary embodiment, the MCS used to transmit PUSCH is determined according to at least one of:
(1) content included in the data;
(2) a latest measured PL and/or RSRP.

In an exemplary embodiment, the MCS indication indicates an MCS configuration by one of:
(1) an N-bit direct indication, where N is a positive integer;
(2) different preamble groups;
(3) different bit-level scrambling and/or interleaving groups.

In an exemplary embodiment, the UCI is modulated and encoded by at least one of:
(1) encoding O UCI bits with RM codes or polar codes;
(2) encoding O UCI bits with RM codes of (16, O) when the O UCI bits are smaller than a first threshold; or encoding the O UCI bits with RM codes of (32, O) when the O UCI bits are not smaller than a second threshold;
(3) encoding O UCI bits with RM codes when the O UCI bits are smaller than a first threshold; or encoding the O UCI bits with polar codes when the O UCI bits are not smaller than a second threshold;
(4) determining a modulation order of the UCI according to a modulation order of the PUSCH,
where O is a positive integer.

In an exemplary embodiment, a Resource Element (RE) mapping scheme of the UCI includes at least one of:
(1) modulated symbols of the UCI being mapped onto available REs according to a principle of frequency domain first or time domain first.
(2) modulated symbols of the UCI being mapped onto REs in an equally-spaced, discrete manner when a number of the modulated symbols of the UCI are smaller than a number of REs available on one time unit,
(3) no rate matching being performed on REs of the PUSCH and modulated symbols of the PUSCH being directly punctured on the REs originally occupied by the modulated symbols of the UCI, when a number of modulated symbols of the UCI is smaller than a first threshold; and rate matching being performed on PUSCH data, when the number of modulated symbols is not smaller than a second threshold;
(4) modulated symbols of the UCI being sequentially mapped onto Orthogonal Frequency Division Multiplexing 'OFDM' symbols from the first non-DMRS symbol;
(5) modulated symbols of the UCI being sequentially mapped onto OFDM symbols from the first non-DMRS symbol after or before the first DMRS symbol;
(6) modulated symbols of the UCI being sequentially mapped onto OFDM symbols from the non-DMRS symbol closest to the first DMRS symbol when the modulated symbols of the UCI occupy a plurality of OFDM symbols; or
(7) multiple pieces of information being placed in a predefined priority order when the multiple pieces of information are included in the UCI.

In an exemplary embodiment, the instructions, when executed by the processor 701, further cause the UE 700 to obtain configuration information for a four-step random access transmission; and determine whether to perform the two-step random access transmission or the four-step random access transmission by one of:
(1) determining whether to select the two-step random access transmission or the four-step random access transmission to be performed according to at least one of:
(1-1) a random access trigger event,
(1-2) a service type,
(1-3) a measured PL and/or RSRP;
(2) always preferring to perform the two-step random access transmission;
(3) randomly selecting the two-step random access transmission or the four-step random access transmission;
(4) determining whether to perform the two-step random access transmission or the four-step random access transmission in response to receiving an indication from the base station.

In an exemplary embodiment, if the preamble and the data are simultaneously transmitted in the first message, the UE determines a transmit beam of the preamble, and sets a transmit beam of the data to be identical to the transmit beam of the preamble.

In an exemplary embodiment, performing the subsequent operation according to the detected second message includes at least one of:
if the uplink grant is detected, continuing an initial transmission of new data, or retransmitting the data in the first message, or falling back to an initial transmission of a Message 3 in the four-step random access;
if the temporary C-RNTI is detected, setting the temporary C-RNTI to a C-RNTI, or ignoring the temporary C-RNTI;
if the timing advance value is detected, calculating a timing advance amount required by a subsequent uplink transmission based on the timing advance value;
if the PUCCH resource indication is detected, feeding back an ACK on the corresponding PUCCH resources after the second message is received; or
if the fallback indication is detected, falling back to the four-step random access process or continuing the two-step random access process according to the fallback indication.

In an exemplary embodiment, when the UE detects the second message using a C-RNTI or an X-RNTI included in the first message, and no correct PDCCH is detected in a detection window, said performing the subsequent operation includes at least one of:
(1) falling back to the four-step random access process;
(2) incrementing a preamble transmission counter by 1; if a configured maximum allowable number of transmissions is not exceeded and/or a preamble transmission timer has not expired, performing a next two-step random access transmission; if the configured maximum allowable number of transmissions is exceeded and/or the preamble transmission timer has expired, reporting a random access problem or falling back to the four-step random access process.

In an exemplary embodiment, when the UE does not detect a correct PDCCH in a detection window, or does not detect a matched contention resolution identifier, or does not detect a matched preamble index,
performing the subsequent operation according to the detection of the second message includes at least one of:
(1) stopping detecting other possible second messages in the detection window;
(2) falling back to the four-step random access process;
(3) incrementing a preamble transmission counter by 1; if a configured maximum allowable number of transmissions is not exceeded and/or a preamble transmission timer has not expired, performing a next two-step random access transmission; if the configured maximum allowable number of transmissions is exceeded and/or the preamble transmission timer has expired, reporting a random access problem or falling back to the four-step random access process; or
(4) continuing to detect other possible second messages in the detection window.

In an exemplary embodiment, in a case where no matched contention resolution identifier is detected, said stopping detecting other possible second messages in the detection window and falling back to the four-step random access process includes at least one of:
(1) if the uplink grant is detected, transmitting or retransmitting the data of the first message using the uplink grant;
(2) if the temporary C-RNTI is detected, searching for a retransmitted PDCCH of a subsequent Message 3 and/or a PDCCH of a Message 4 using the temporary C-RNTI or X-RNTI;
(3) if the timing advance value is detected, calculating a timing advance amount required by a subsequent uplink transmission based on the timing advance value; or
(4) falling back to the four-step random access transmission and retransmitting the preamble.

In an exemplary embodiment, the instructions, when executed by the processor 701, cause the UE 700 to: when the UE does not detect the correct PDCCH, or does not detect the matched contention resolution identifier, or does not detect the matched random access preamble index by using the X-RNTI for detecting the second message of the two-step random access, switching, by the UE, to detecting the second message by using an X-RNTI for detecting a second message of the four-step random access.

Hereinafter, a flowchart of a method at a base station for signal transmission according to an exemplary embodiment of the present disclosure will be described in detail with reference to FIG. 8. Details that have been described in the method 300 at the UE for signal transmission will be omitted here for simplicity.

Figure 8:
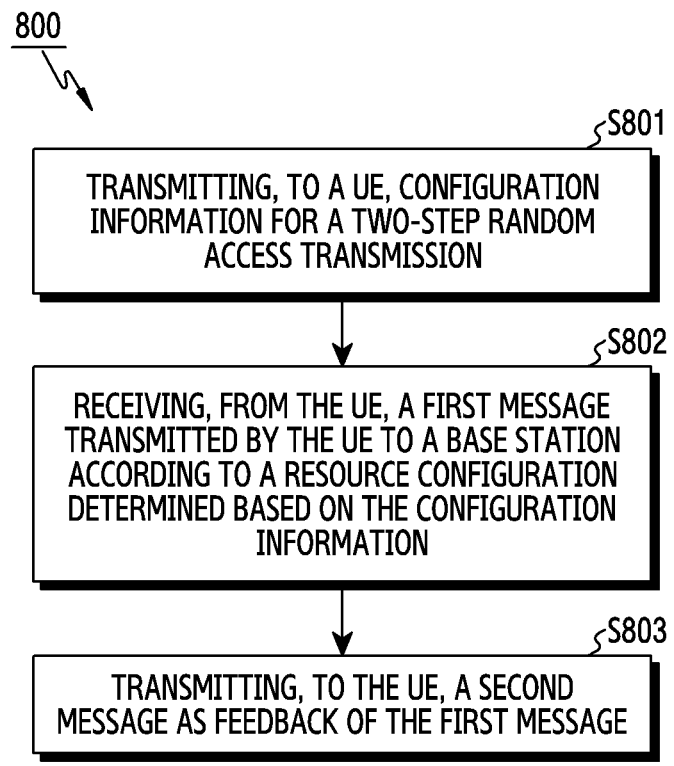
FIG. 8 illustrates a method at a base station for signal transmission according to an exemplary embodiment of the present disclosure.

As shown in FIG. 8, the method 800 includes steps S801-S803.

In step S801, the base station transmits, to a UE, configuration information for a two-step random access transmission.

In an exemplary embodiment, the configuration information for the two-step random access transmission may include at least one of:
(1) a collection of time-frequency resources for the two-step random access transmission;
(2) a mapping relationship between two-step random access time-frequency resources and downlink beams;
(3) a resource pool of X-RNTIs for the two-step random access transmission;
(4) a configuration of control resources and/or a configuration of search spaces for searching for feedback of the two-step random access transmission;
(5) a maximum number of transmissions for the two-step random access transmission;
(6) a maximum transmission time for the two-step random access transmission;
(7) multiple available PUCCH resource configurations.

In step S802, the base station receives, from the UE, a first message transmitted by the UE to a base station according to a resource configuration determined based on the configuration information, detects a preamble and/or decodes a data portion in the first message, and prepares a second message as feedback of the first message.

In particular, the second message may include at least one of:
(1) a contention resolution identifier,
(2) an uplink grant,
(3) a temporary C-RNTI,
(4) a timing advance value,
(5) a PUCCH resource indication for indicating the UE to feed back an ACK on a corresponding PUCCH resource after receiving the second message,
(6) scheduling information for a downlink transmission,
(7) a fallback indicator,
(8) a backoff indicator.

In step S803, the base station transmits the second message to the UE.

Figure 9:
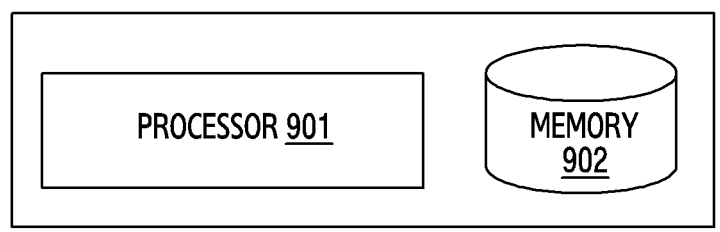
FIG. 9 illustrates a structure block diagram of a base station according to an exemplary embodiment of the present disclosure.

The structure of a base station according to an embodiment of the present disclosure will be described below with reference to FIG. 9. FIG. 9 schematically illustrates a schematic structural diagram of a base station 900 according to an embodiment of the present disclosure. The base station 900 may be used to perform the method 800 described with reference to FIG. 8.

As shown in FIG. 9, the base station 900 includes a processing unit or processor 901, which may be a single unit or a combination of a plurality of units for performing different steps of the method; a memory 903 in which computer-executable instructions are stored, which instructions, when executed by the processor 902, cause the base station 900 to perform the method 800. For the sake of simplicity, only the schematic structure of the base station according to an exemplary embodiment of the present disclosure will be described herein, and the details previously described in the method 800 described with reference to FIG. 8 is omitted.

In an exemplary embodiment in which the instructions, when executed by the processor 901, cause the base station 900 to perform the method 800, the instructions cause the base station 900 to:

transmit, to a UE, configuration information for a two-step random access transmission;

receive, from the UE, a first message transmitted by the UE to a base station according to a resource configuration determined based on the configuration information, wherein the first message includes a preamble and/or data; and transmit, to the UE, a second message as feedback of the first message.

As previously described, the second message includes at least one of:
(1) a contention resolution identifier,
(2) an uplink grant,
(3) a temporary C-RNTI,
(4) a timing advance value,
(5) a PUCCH resource indication,
(6) scheduling information for a downlink transmission,
(7) a fallback indicator,
(8) a backoff indicator.

The program running on the device according to the present invention may be a program that causes a computer to implement the functions of the embodiments of the present invention by controlling a central processing unit (CPU). The program or information processed by the program may be temporarily stored in a volatile memory (such as a random access memory RAM), a hard disk drive (HDD), a non-volatile memory (such as a flash memory), or other memory system.

A program for realizing the functions of the embodiments of the present invention may be recorded on a computer readable recording medium. The corresponding functions may be realized by causing a computer system to read programs recorded on the recording medium and execute the programs. The phrase "computer system" used herein may be a computer system embedded in the device, and may include an operating system or hardware (such as a peripheral device). The "computer readable recording medium" may be a semiconductor recording medium, an optical recording medium, a magnetic recording medium, a recording medium of a short-term dynamic storage program, or any other recording medium readable by a computer.

The various features or functional blocks used in the device in the above embodiments may be implemented or executed by circuitry (e.g., monolithic or multi-chip integrated circuits). Circuitry designed to perform the functions described in this specification may include general purpose processors, digital signal processors (DSPs), application specific integrated circuits (ASICs), field programmable gate arrays (FPGAs), or other programmable logic devices, discrete gates or transistor logic, discrete hardware components, or any combination of the above. A general purpose processor may be a microprocessor or any existing processor, controller, microcontroller, or state machine. The above circuit may be a digital circuit or an analog circuit. One or more embodiments of the present invention may also be implemented using new integrated circuit technologies in the context of the new integrated circuit technologies that replace existing integrated circuits due to advances in semiconductor technology.

As above, the embodiments of the present invention have been described in detail with reference to the accompanying drawings. However, the specific structure is not limited to the above embodiments, and the present invention also includes any design modifications not departing from the spirit of the present invention. In addition, various modifications may be made to the invention within the scope of the claims, and the embodiments obtained by appropriately combining the technical means disclosed in the different embodiments are also included in the scope of the present invention. Further, the components having the same effects described in the above embodiments may be substituted for each other.

The above description is only preferred embodiments of the present application and a description of the principles of the applied technology. It should be understood by those skilled in the art that the scope of the invention is not limited to technical solutions formed by specifically combining the above technical features, and should also cover other technical solutions formed by arbitrarily combining the above technical features and their equivalent features, for example, a technical solution formed by replacing the technical features with those having similar functions disclosed (but not limited to) in the present application.

The invention claimed is:

1. A method performed by a user equipment (UE) in a wireless communication system, the method comprising:
    identifying whether a reference signal received power (RSRP) of a reference signal is above a configured threshold for selection between a 2-step random access (RA) and a 4-step RA;
    in response to the RSRP being above the configured threshold, setting an RA type to the 2-step RA;
    in response to the RSRP not being above the configured threshold, setting the RA type to the 4-step RA; and
    transmitting, to a base station, a first message including an RA preamble according to the RA type,
    wherein, in response to the RA type being set to the 2-step RA, the method further comprises:
        determining two radio network temporary identifiers (RNTIs) used for detecting a second message associated with a random access response (RAR) in response to the first message; and
        detecting the second message within an RAR window based on one of the two RNTIs.

2. The method of claim 1, further comprising:
    in response to a data received based on the second message not including a contention resolution identity, and an RA preamble identifier in the data matching a preamble index transmitted to the base station, transmitting, to the base station, a message 3 (MSG3) including a medium access control (MAC) protocol data unit (PDU),
        wherein the MAC PDU included in the MSG3 is same as a MAC PDU which was transmitted to the base station in the first message.

3. The method of claim 1, wherein, in response to the RA type being set to the 2-step RA, the method further comprises:
    transmitting, to the base station, a physical uplink shared channel (PUSCH) after transmitting the RA preamble for the 2-step RA; and
    detecting a DCI for an RAR during a window, and
    wherein the window starts at an earliest control resource set (CORESET) that is at least one symbol after a last symbol of the PUSCH.

4. The method of claim 3, wherein the PUSCH uses a same spatial filter as the RA preamble.

5. The method of claim 1, wherein a first RNTI included in the two RNTIs is used for detecting the second message for the 2-step RA, and
    wherein a second RNTI included in the two RNTIs is used for detecting the second message for the 4-step RA.

6. A method performed by a base station in a wireless communication system, the method comprising:
    transmitting, to a user equipment (UE), a reference signal; and
    receiving, from the UE, a first message including a random access (RA) preamble according to an RA type,
    wherein, in response to a reference signal received power (RSRP) of the reference signal being above a configured threshold, the RA type is a 2-step RA,
    wherein, in response to the RSRP not being above the configured threshold, the RA type is a 4-step RA,
    wherein, in response to the RA type being the 2-step RA, the method further comprises transmitting, to the UE, a second message associated with a random access response (RAR) in response to the first message, and
    wherein the second message is transmitted based on one of two radio network temporary identifiers (RNTIs) for the second message within an RAR window.

7. The method of claim 6, further comprising:
    in response to a data transmitted based on the second message not including a contention resolution identity, and an RA preamble identifier included in the data matching a preamble index received from the UE, receiving, from the UE, a message 3 (MSG3) including a medium access control (MAC) protocol data unit (PDU),
        wherein the MAC PDU included in the MSG3 is same as a MAC PDU which was received from the UE in the first message.

8. The method of claim 6, wherein, in response to the RA type being the 2-step RA, the method further comprises:
    receiving, from the UE, a physical uplink shared channel (PUSCH) after receiving the RA preamble for the 2-step RA; and
    transmitting a DCI for an RAR during a window, and
    wherein the window starts at an earliest control resource set (CORESET) that is at least one symbol after a last symbol of the PUSCH.

9. The method of claim 8, wherein the PUSCH uses a same spatial filter as the RA preamble.

10. The method of claim 6, wherein a first RNTI included in the two RNTIs is for the second message for the 2-step RA, and
    wherein a second RNTI included in the two RNTIs is for the second message for the 4-step RA.

11. A user equipment (UE) in a wireless communication system, the UE comprising:
    a transceiver; and
    at least one processor coupled with the transceiver and configured to:
        identify whether a reference signal received power (RSRP) of a reference signal is above a configured threshold for selection between a 2-step random access (RA) and a 4-step RA,
        in response to the RSRP being above the configured threshold, set an RA type to the 2-step RA, in response to the RSRP not being above the configured threshold, set the RA type to the 4-step RA, and transmit, to a base station, a first message including an RA preamble according to the RA type, wherein, in response to the RA type being set to the 2-step RA, the at least one processor is further configured to:

determine two radio network temporary identifiers (RNTIs) used for detecting a second message associated with a random access response (RAR) in response to the first message, and detect the second message within an RAR window based on one of the two RNTIs.

12. The UE of claim 11, wherein the at least one processor is further configured to:

in response to a data received based on the second message not including a contention resolution identity, and an RA preamble identifier in the data matching a preamble index transmitted to the base station, transmit, to the base station, a message 3 (MSG3) including a medium access control (MAC) protocol data unit (PDU), and wherein the MAC PDU included in the MSG3 is same as a MAC PDU which was transmitted to the base station in the first message.

13. The UE of claim 11, wherein, in response to the RA type being set to the 2-step RA, the at least one processor is further configured to:

transmit, to the base station, a physical uplink shared channel (PUSCH) after transmitting the RA preamble for the 2-step RA, and detect a DCI for an RAR during a window, and wherein the window starts at an earliest control resource set (CORESET) that is at least one symbol after a last symbol of the PUSCH.

14. The UE of claim 13, wherein the PUSCH uses a same spatial filter as the RA preamble.

15. The UE of claim 11, wherein a first RNTI included in the two RNTIs is used for detecting the second message for the 2-step RA, and wherein a second RNTI included in the two RNTIs is used for detecting the second message for the 4-step RA.

16. A base station in a wireless communication system, the base station comprising:

a transceiver; and at least one processor coupled with the transceiver and configured to:

transmit, to a user equipment (UE), a reference signal, and receive, from the UE, a first message including a random access (RA) preamble according to an RA type, wherein, in response to a reference signal received power (RSRP) of the reference signal being above a configured threshold, the RA type is a 2-step RA, wherein, in response to the RSRP not being above the configured threshold, the RA type is a 4-step RA, wherein, in response to the RA type being the 2-step RA, the at least one processor is further configured to transmit, to the UE, a second message associated with a random access response (RAR) in response to the first message, and wherein the second message is transmitted based on one of two radio network temporary identifiers (RNTIs) for the second message within an RAR window.

17. The base station of claim 16, wherein the at least one processor is further configured to:

in response to a data transmitted based on the second message not including a contention resolution identity, and an RA preamble identifier included in the data matching a preamble index received from the UE, receive, from the UE, a message 3 (MSG3) including a medium access control (MAC) protocol data unit (PDU), and wherein the MAC PDU included in the MSG3 is same as a MAC PDU which was received from the UE in the first message.

18. The base station of claim 16, wherein, in response to the RA type being the 2-step RA, the at least one processor is further configured to:

receive, from the UE, a physical uplink shared channel (PUSCH) after receiving the RA preamble for the 2-step RA, and transmit a DCI for an RAR during a window, and wherein the window starts at an earliest control resource set (CORESET) that is at least one symbol after a last symbol of the PUSCH.

19. The base station of claim 18, wherein the PUSCH uses a same spatial filter as the RA preamble.

20. The base station of claim 16, wherein a first RNTI included in the two RNTIs is for the second message for the 2-step RA, and wherein a second RNTI included in the two RNTIs is for the second message for the 4-step RA.

* * * * *